(12) United States Patent
Desai et al.

(10) Patent No.: US 7,703,138 B2
(45) Date of Patent: Apr. 20, 2010

(54) USE OF APPLICATION SIGNATURE TO IDENTIFY TRUSTED TRAFFIC

(75) Inventors: Nehal G. Desai, Chandler, AZ (US); Patrick J. Chauvin, Austin, TX (US); Jac M. Noel, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1284 days.

(21) Appl. No.: 11/027,871

(22) Filed: Dec. 29, 2004

(65) Prior Publication Data

US 2006/0143710 A1 Jun. 29, 2006

(51) Int. Cl.
G06F 21/00 (2006.01)
(52) U.S. Cl. .................... 726/23; 713/176; 370/252
(58) Field of Classification Search .................. 726/23; 713/176; 370/252, 389, 411; 709/249
See application file for complete search history.

(56) References Cited

U.S. PATENT DOCUMENTS

| | | | | |
|---|---|---|---|---|
| 5,590,128 | A * | 12/1996 | Maloney et al. | 370/260 |
| 5,742,607 | A * | 4/1998 | Beighe et al. | 370/419 |
| 6,430,184 | B1 * | 8/2002 | Robins et al. | 370/392 |
| 2001/0056533 | A1 * | 12/2001 | Yianilos et al. | 713/153 |
| 2002/0176577 | A1 * | 11/2002 | Xu | 380/258 |
| 2003/0041266 | A1 * | 2/2003 | Ke et al. | 713/201 |
| 2003/0097557 | A1 * | 5/2003 | Tarquini et al. | 713/153 |
| 2003/0185368 | A1 * | 10/2003 | Bradfield et al. | 379/201.03 |
| 2003/0196081 | A1 * | 10/2003 | Savarda et al. | 713/153 |
| 2003/0204632 | A1 * | 10/2003 | Willebeek-LeMair et al. | 709/249 |
| 2003/0226021 | A1 * | 12/2003 | Chiu | 713/181 |
| 2004/0128550 | A1 * | 7/2004 | Govindarajan et al. | 713/201 |
| 2005/0270983 | A1 * | 12/2005 | Remedios | 370/252 |

OTHER PUBLICATIONS

Uga et al, "A novel ultra high-speed multi-layer table lookup method using TCAM for differentiated services in the Internet", 2001 IEEE Workshop on High Performance Switching and Routing, May 29-31, 2001, pp. 240-244.*
PCI-SIG "PCI Specifications," www.pcisig.com, copyright 2004; 18 pp.
Krueger, et al. "Small Computer Systems Interface protocol over the Internet (iSCSI) Requirements and Design Considerations," Network Working Group of The Internet Society, RFC 3347, (2002), 23 pp.
Shanley, T. and D. Anderson, "PCI System Architecture, 4th edition," Mindshare, Inc., 1999; Chapters 1 & 2, 61 pp.

(Continued)

*Primary Examiner*—Gilberto Barron, Jr.
*Assistant Examiner*—Hadi Armouche
(74) *Attorney, Agent, or Firm*—Konrad Raynes & Victor LLP; Janaki K. Davda

(57) ABSTRACT

Provided are techniques for monitoring communication packets. A communication packet is received. A communication packet signature of the communication packet is determined. The communication packet signature is compared to one or more site-specific application signatures. In response to determining that the communication packet signature matches at least of the one or more site-specific application signatures, it is determined that the communication packet is to be trusted.

24 Claims, 4 Drawing Sheets

OTHER PUBLICATIONS

Weber, et al. "Fibre Channel France Encapsulation," Network Working Group, Request for Comments 3643; Dec. 2003; 17 pp.

"Serial ATA: High Speed Serialized AT Attachment," Serial ATA Workgroup rev. 1.0, Aug. 29, 2001; 36 pp.

"Transmission Control Protocol: DARPA Internet Program Protocol Specification," Information Sciences Institute for Defense Advanced Research Projects Agency, RFC 793, (Sep. 1981), 80 pp.

"Internet Protocol: DARPA Internet Program Protocol Specification," Information Sciences Institute for Defense Advanced Research Projects Agency, RFC 791, (Sep. 1981), 44 pp.

IEEE Std 802.3—2002, Part 3: Carrier sense multiple access with collision detection (CSMA/CD) access method and physical layer specifications, Mar. 8, 2002; 33 pp.

"dpANS Fibre Channel Protocol for SCSI," X3.269-199X, Revision 12, Dec. 4, 1995; 75 pp.

"dpANS Information Technology—SCSI Architecture Model—2 (SAM-2)," T10 Project 1157-D, www.t10.org, 91 pp.

IEEE Supplement, Std. 802.11b-1999, Part 11: Wireless LAN Medium Access Control and Physical Layer Specifications, Sep. 16, 1999; 17 pp.

* cited by examiner

US 7,703,138 B2

USE OF APPLICATION SIGNATURE TO IDENTIFY TRUSTED TRAFFIC

BACKGROUND

In a network of computing devices, Intrusion Detection System (IDS) sensors monitor network traffic (also referred to as "network packets") and are used to detect suspicious or malicious traffic (e.g., viruses). Conventional IDS sensors monitor network traffic based on known vulnerabilities and anomaly detection. Rules that specify the vulnerabilities and anomalies are typically stored in a database. The rules typically specify a pattern that the IDS sensors try to identify. When a network packet is received at an IDS sensor, the IDS sensor compares the network packet to the rules. For example, a virus has a certain signature. A signature may be described as providing a description of how the virus acts and which code the virus executes. Then, the rule for the virus may specify the signature, along with information, such as which port of a computing device the virus usually attacks.

Conventional IDS sensors may include a large number of rules. In some cases, the IDS sensors identify a network packet as suspicious or malicious, even though the network packet may be "trusted" (i.e., routing of the network packet on the network may continue as the network packet has been determined not to be suspicious or malicious). Thus, false-positive alerts are created and sometimes hard to distinguish. A false-positive alert is one that turns out to be "false" (i.e., a network packet is identified as suspicious or malicious even though the network packet may be "trusted").

Moreover, the IDS sensors may provide a large number of alerts that have to be sorted and manually inspected by highly trained security personnel. For example, IDS sensors may generate many (e.g., thousands of) alerts that need to be manually inspected before the alerts can be processed appropriately.

Thus, there is a need in the art for improved intrusion detection systems.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
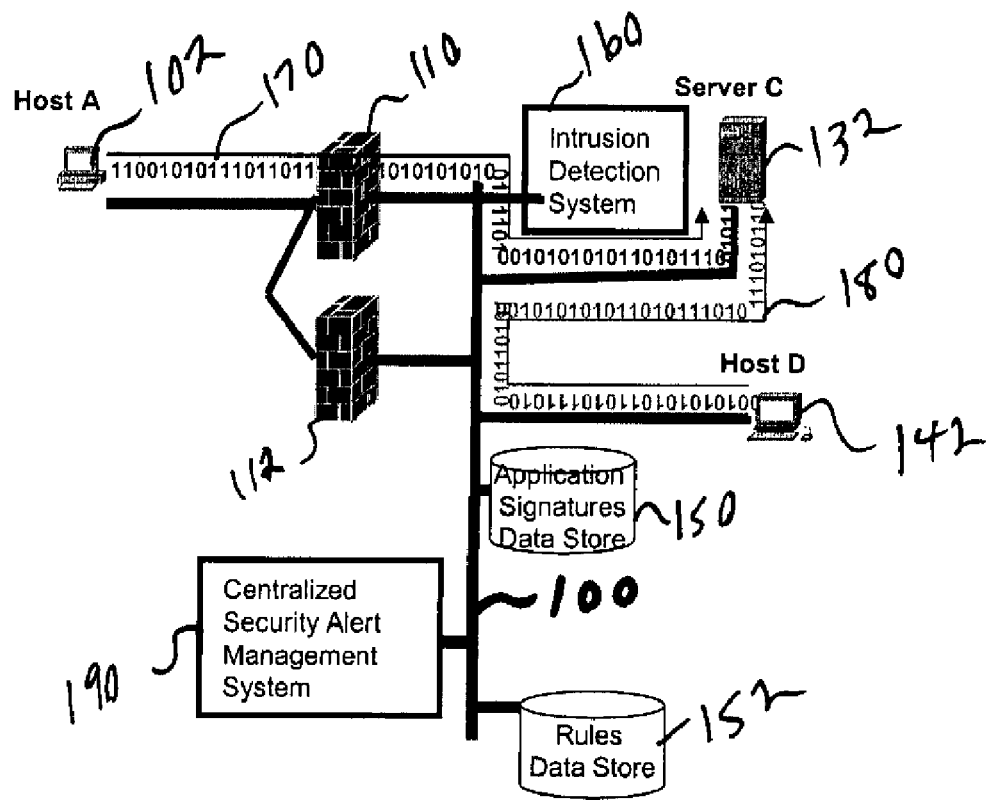
FIG. 1 illustrates details of a computing environment in accordance with certain embodiments.

FIG. 1 illustrates details of a computing environment in accordance with certain embodiments. Computing devices Host A 102, Host D 142, and Server C 132 are each coupled to communication path 100, which enables them to communicate with each other. Although three computing devices are illustrated, any number of computing devices may be included in various embodiments. Also, each computing device may be part of a network of devices. For example, Host A 102 may be part of a network of multiple hosts, data stores, etc. Similarly, Host D 142 and Server C 132 may be within subnets of one network or may be in different networks.

In the example of FIG. 1, Application E (not shown) executes on Host A 102, which is connected through firewalls 110, 112 to Host D 142 and Server C 132. In this example, Application B (not shown) executes on Host D 142.

An application signatures data store 150 that stores site-specific application signatures is coupled to the communication path 100. Each site-specific application signature is associated with an application executing at a specific computing device (i.e., "site"). The site-specific application signatures may be added to, modified in, or deleted from the application signatures data store 150 by, for example, a system administrator. In alternative embodiments, the site-specific application signatures may be stored in a file at the Intrusion Detection System (IDS) 160. Also, a rules data store 152 is coupled to the communication path 100 and stores rules for detecting vulnerabilities and anomalies. The rules may be added to, modified in, or deleted from the rules data store 152 by, for example, a system administrator. Although one application signatures data store 150 and one rules data store 152 are illustrated, any number of data stores 150, 152 may be coupled to the communication path 100.

Examples of site-specific application signatures include:
Host A to Server C TCP 80
Host D to Server C TCP 135

For example, site-specific application signature "Host A to server C TCP 80" is associated with a communication packet (e.g., a network packet) being sent by application E at Host A 102 to server C 132 via Transmission Control Protocol (TCP) on port 80 of server C 132. Similarly, site-specific application signature "Host D to Server C TCP 135" is associated with a communication packet being sent by application B at Host D 142 to server C 132 via TCP on port 135 of server C 132. The terms "Host" and "Server" are used in the examples of site-specific application signatures to represent the source address of the communication packet and the destination address of the communication packet.

An Intrusion Detection System (IDS) 160 that includes an application signatures engine (220, FIG. 2) is coupled to the communication path 100. The IDS 160 includes one or more sensors (202, FIG. 2) for monitoring communication packets that are routed between Host A 102, Host D 142, and server C 132. Although one IDS 160 is illustrated, any number of Intrusion Detection Systems may be included in various embodiments.

Communication route 170 (which is part of communication path 100) enables a communication packet to be routed from Host A 102 to server C 132. Communication route 180 (which is part of communication path 100) enables a communication packet to be routed from Host D 142 to server C 132. The IDS 160 monitors communication packets passing along the portion of the communication path 100 at which the IDS 160 is coupled and determines whether the communication packets are "trusted" or "untrusted." A trusted communication packet may be described as one for which routing of the communication packet may continue as the communication packet has been determined to have a matching site-specific application signature.

A centralized security alert management system 190 is coupled to the communication paths. The IDS 160 sends alerts to the centralized security alert management system 190, which then processes the alerts (e.g., notifies a system administrator).

Figure 2:
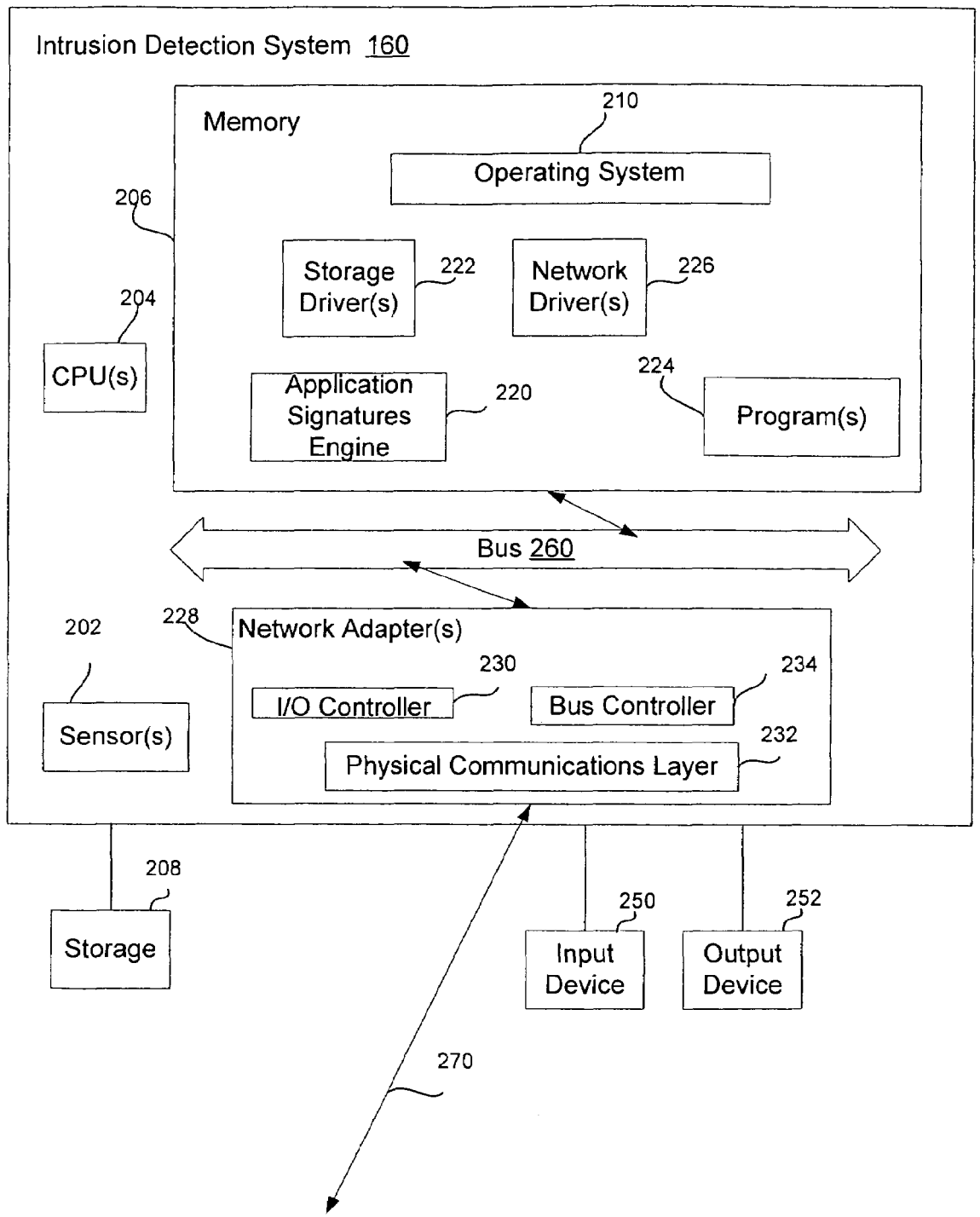
FIG. 2 illustrates further details of an Intrusion Detection System (IDS) in accordance with certain embodiments.

FIG. 2 illustrates further details of an IDS 160 in accordance with certain embodiments. IDS 160 includes one or more sensors 202 for monitoring communication packets. IDS 160 includes one or more central processing units (CPUs) 204 (i.e., processors), a volatile memory 206, non-volatile storage 208 (e.g., magnetic disk drives, optical disk drives, a tape drive, etc.), and one or more network adapters 228. The network adapters 228 may be described as adapters enabling communication with a network. Memory 206 stores an operating system 210. An application signatures engine 220 may be stored in memory 206. In alternative implementations, the application signatures engine 220 may be implemented in a router rather than at IDS 160. One or more storage drivers 222, one or more programs 224, and one or more network drivers 226 reside in memory 206 for execution by CPUs 204 and are capable of transmitting and retrieving communication packets over network 270.

The IDS 160 may comprise any computing device known in the art, such as a mainframe, server, personal computer, workstation, laptop, handheld computer, telephony device, network appliance, virtualization device, storage controller, etc. Any CPU 204 and operating system 210 known in the art may be used. Programs and data in memory 206 may be swapped into storage 208 as part of memory management operations.

Network 270 may be any type of network such as, for example, a Storage Area Network (SAN), a Local Area Network (LAN), Wide Area Network (WAN), the Internet, an Intranet, etc.

Each network driver 226 includes network adapter 228 specific commands to communicate with each network adapter 228 and interface between the operating system 210, each storage driver 222, and each network adapter 228. Each network adapter 228 or network driver 226 implements logic to process network packets, such as a transport protocol layer to process the content of messages included in the packets that are wrapped in a communication protocol, such as Transmission Control Protocol (TCP) (IETF RFC 793, published September 1981) and/or Internet Protocol (IP) (IETF RFC 791, published September 1981), the Internet Small Computer System Interface (iSCSI) (IETF RFC 3347, published February 2003), Fibre Channel (American National Standards Institute (ANSI) X3.269-199X, Revision 012, Dec. 4, 1995), or any other communication protocol known in the art. The transport protocol layer unpacks data from a payload from the received Transmission Control Protocol/Internet Protocol (TCP/IP) packet and transfers the data to a network driver 226 to return to a program 224. Further, a program 224 transmitting data transmits the data to a network driver 226, which then sends the data to the transport protocol layer to package in a TCP/IP packet before transmitting over the network 270.

Each network adapter 228 includes various components implemented in the hardware of the network adapter 228. Each network adapter 228 is capable of transmitting and receiving packets of data over a network 270.

A bus controller 234 enables each network adapter 228 to communicate on a computer bus 260, which may comprise any bus interface known in the art, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 2.0a, published 2002), published March 2002), Small Computer System Interface (SCSI) (American National Standards Institute (ANSI) SCSI Controller Commands-2 (SCC-2) NCITS.318:1998), Serial ATA (SATA 2.0a Specification, published Feb. 4, 2003), etc.

The network adapter 228 includes a network protocol for implementing a physical communication layer 232 to send and receive communication packets to and from remote data storages over the network 270. In certain embodiments, the network adapter 228 may implement the Ethernet protocol (IEEE std. 802.3, published Mar. 8, 2002), Fibre Channel, or any other network communication protocol known in the art.

The network adapter 228 includes an Input/Output (I/O) controller 230. In certain embodiments, the I/O controller 230 may comprise Internet Small Computer System Interface (iSCSI controllers), and it is understood that other types of network controllers, such as an Ethernet Media Access Controller (MAC) or Network Interface Controller (NIC), or cards may be used.

The network adapter 228 may include additional hardware logic to perform additional operations to process received packets from the IDS 160 or the network 270.

The storage 208 may comprise an internal storage device or an attached or network accessible storage. Programs in the storage 208 may be loaded into the memory 206 and executed by the CPU 204. An input device 250 is used to provide user input to the CPU 204, and may include a keyboard, mouse, pen-stylus, microphone, touch sensitive display screen, or any other activation or input mechanism known in the art. An output device 252 is capable of rendering information transferred from the CPU 204, or other component, such as a display monitor, printer, storage, etc.

Various structures and/or buffers (not shown) may reside in memory 206 or may be located in a storage unit separate from the memory 206 in certain embodiments.

Figure 3:
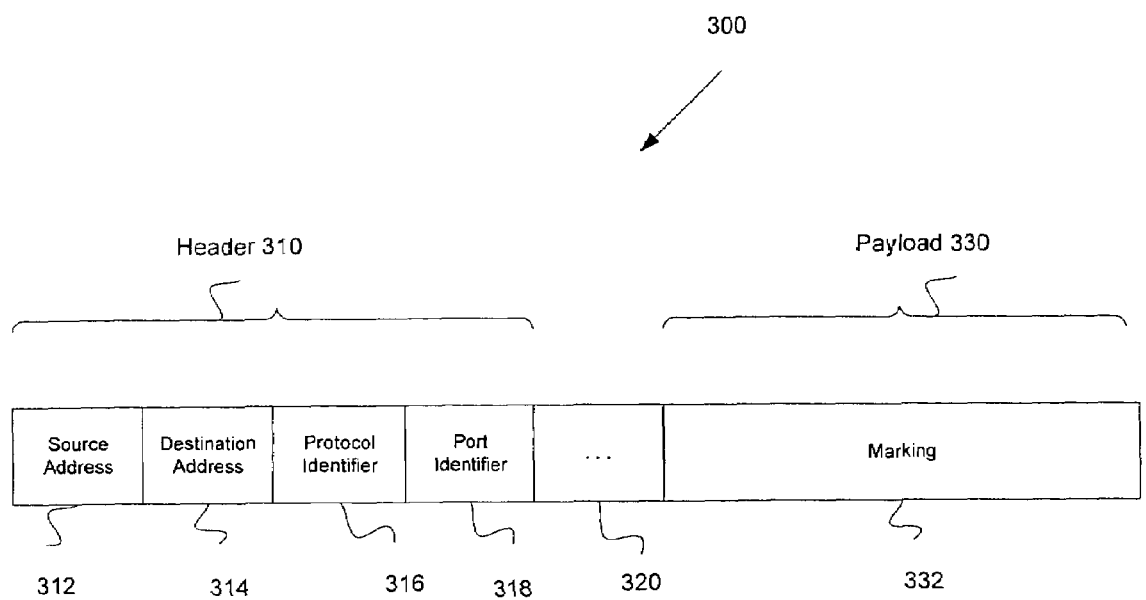
FIG. 3 illustrates a communication packet in accordance with certain embodiments.

FIG. 3 illustrates a communication packet 300 in accordance with certain embodiments. The communication packet 300 includes several fields, such as a header 310 and a payload 330. Additionally, ellipses 320 indicate that additional fields may be part of the header 310, part of the payload 330, independent of these fields 310, 330, or some combination of these options. The header 310 includes a source address 312 that identifies the source of the communication packet 300 (e.g., with an Internet Protocol (IP) address), a destination address 314 that identifies the destination of the communication packet 300 (e.g., an IP address), a protocol identifier 316 that identifies the protocol in which the communication packet 300 is being transmitted (e.g., TCP), and a port identifier 318 that identifies a port to which the communication packet 300 is being sent. In certain embodiments, a site-specific application signature is made up of the source address 312, destination address 314, protocol identifier 316, and port identifier 318. In certain embodiments, the payload 330 may include a marking 332 that may be used as a site-specific application signature. In these embodiments, the application signatures data store 150 identifies the marking as the site-specific application signature.

Figure 4:
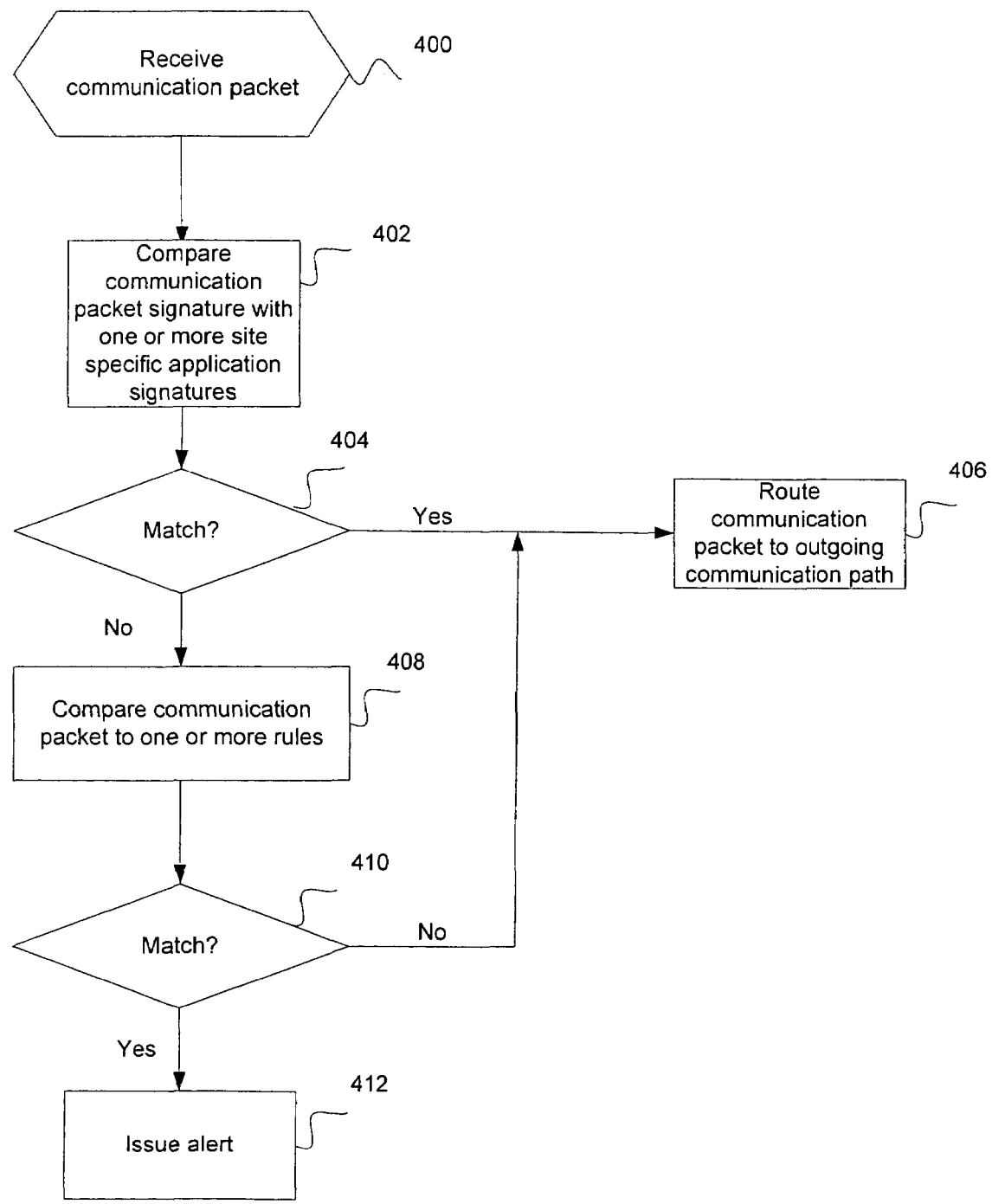
FIG. 4 illustrates operations for monitoring communication packets in accordance with certain embodiments.

FIG. 4 illustrates operations for monitoring communication packets in accordance with certain embodiments. Control begins at block 400 with the application signatures engine 220 receiving a communication packet. In block 402, the application signatures engine 220 compares the communication packet signature with one or more site-specific application signatures. The communication packet signature may be described as an application signature of the communication packet. Site-specific application signatures stored in one or more application signatures data stores (e.g., 150) may be periodically bulk imported into IDS 160 or queried by the application signatures engine 220. In certain embodiments, the application signatures engine 220 retrieves the source address 312, destination address 314, protocol identifier 316, and port identifier 318 from the communication packet and searches for a corresponding site-specific application signature. If the corresponding site-specific application signature is found, then the application signatures engine 220 determines that the communication packet is "trusted" and does not raise an alert. In alternative embodiments, the application signatures engine 220 retrieves a marking 332 from the payload 330 and searches for a corresponding site-specific application signature with that marking. If the corresponding site-specific application signature is found, then the application signatures engine 220 determines that the communication packet is "trusted" and does not raise an alert. In further embodiments, the site-specific application signature is a combination of fields from the header 310 and a marking 332 from the payload 330. Also, once the application signatures engine 220 determines that the communication packet is "trusted", the application signatures engine 220 allows the communication packet to continue on the communication path 100 without comparing the communication packet to rules that determine whether the communication packet has vulnerabilities or anomalies. This saves resources and limits the number of false-positive alerts.

In particular, in block 404, the application signatures engine 220 determines whether the communication packet signature matches a site-specific application signature. If so, processing continues to block 406, otherwise, processing continues to block 408. If there is a match, then the communication packet is determined to be "trusted" and is routed to the outgoing communication path 100 (e.g., outgoing network) (block 406).

For example, if a communication packet has a signature of Host B to Server C TCP 135, and the application signatures data store 150 has site-specific application signatures Host A to Server C TCP 80 and Host D to Server C TCP 135, then the application signatures engine 220 determines that there is no match and processing continues to block 408. If the communication packet has the signature Host D to Server C TCP 135, then, in this example, the application signatures engine 220 determines that the communication packet is "trusted".

If the communication packet signature does not match a site-specific application signature, then further processing occurs to determine whether the communication packet is suspicious or malicious. In particular, in block 408, the application signatures engine 220 compares the communication packet to one or more rules. Rules stored in one or more rules data stores (e.g., 152) may be periodically bulk imported into IDS 160 or queried by the application signatures engine 220. In block 410, the application signatures engine 220 determines whether the communication packet matches one or more rules. If there is a match, then the communication packet is determined to be "untrusted" and an alert is issued (block 412). In certain embodiments, the application signatures engine 220 stores the alert in, for example, a file and periodically routes the file to the centralized security alert management system 190. If there is no match, then the communication packet is determined to be "trusted" and processing continues to block 406 from block 410. In block 406, the communication packet is routed to the outgoing communication path.

Thus, incoming communication packets are compared with site-specific application signatures to see whether they are trusted communication packets. A trusted communication packet is allowed continue on the communication path without the application signatures engine 220 generating an alert. If the communication packet does not match a site-specific application signature, the communication packet is compared to rules to determine whether there are any vulnerabilities or anomalies for which an alert should be issued.

By automating and using the application signatures engine 220 and one or more application signatures data stores, network surveillance is more focused on suspicious traffic and abnormalities. This allows entities, such as a Security Operation Center (SOC) and factory operations, to improve their response time by reducing effort around false-positives and efforts to be concentrated on untrusted traffic patterns.

With embodiments, communication packets seen by the application signatures engine 220 are reconciled against trusted traffic patterns that are identified with the site-specific application signatures. Thus, embodiments include one or more application signatures data stores that store site-specific application signatures and one or more intrusion detection systems that use the site-specific application signatures to suppress invalid intrusion alerts. The embodiments may additionally include one or more centralized security alert management systems that process alerts issued by the application signatures engine.

Additional Embodiment Details

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adaptors, etc., may be implemented in one or more integrated circuits on the adaptor or on the motherboard.

The illustrated operations of FIG. 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for monitoring communication packets, comprising:
   storing site-specific application signatures, wherein each of the site-specific application signatures includes a source address, a destination address, a protocol identifier, and a port identifier, wherein each of the site-specific application signatures is associated with an application executing at a specific source computing device;
   storing rules that determine whether the communication packet has vulnerabilities or anomalies;
   receiving a communication packet;
   determining a communication packet signature of the communication packet, wherein the communication packet signature includes a source address, a destination address, a protocol identifier, and a port identifier;
   comparing the communication packet signature to the site-specific application signatures by comparing the source address, the destination address, the protocol identifier, and the port identifier of the communication packet with the site-specific application signatures;
   in response to determining that the communication packet signature matches at least one of the site-specific application signatures, determining that the communication packet is to be trusted and allowing the communication packet to be routed without comparing the communication packet to the rules that determine whether the communication packet has vulnerabilities or anomalies, wherein the communication packet signature matches at least one of the site-specific signatures when the source address, the destination address, the protocol identifier, and the port identifier of the communication packet matches the source address, the destination address, the protocol identifier, and the port identifier of the at least one site-specific application signatures; and
   in response to determining that the communication packet signature does not match at least one of the site-specific application signatures, comparing the communication packet to the rules that determine whether the communication packet has vulnerabilities or anomalies by:
      determining whether the communication packet matches the rules;
      in response to determining that the communication packet matches one or more rules, issuing an alert; and
      in response to determining that that communication packet does not match the rules, allowing the communication packet to be routed without issuing the alert.

2. The method of claim 1, further comprising:
   in response to determining that the communication packet is to be trusted, allowing the communication packet to be routed without issuing an alert.

3. The method of claim 1, wherein a site-specific application signature comprises a source address of a source computing device from which the communication packet is sent, a destination address of the destination computing device to which the communication packet is sent, a protocol identifier identifying a protocol in which the communication packet is sent, and a port identifier identifying a port on the destination computing device to which the communication packet is sent.

4. The method of claim 1, wherein a site-specific application signature comprises a marking of a payload in the communication packet.

5. The method of claim 1, further comprising:
   periodically importing the site-specific application signatures from one or more application signatures data stores.

6. The method of claim 1, further comprising:
   querying at least one application signatures data store for the site-specific application signatures.

7. A system for monitoring communication packets on a network, comprising:
   one or more application signatures data stores coupled to the network storing site-specific application signatures, wherein each of the site-specific application signatures includes a source address, a destination address, a protocol identifier, and a port identifier, wherein each of the site-specific application signatures is associated with an application executing at a specific source computing device;
   a rules data store storing rules that determine whether a communication packet has vulnerabilities or anomalies;
   a processor; and
   a computer readable medium including code capable of being executed by the processor to perform operations comprising:
      receiving a communication packet;
      determining a communication packet signature of the communication packet, wherein the communication packet signature includes a source address, a destination address, a protocol identifier, and a port identifier;
      comparing the communication packet signature to the site-specific application signatures in the one or more application signatures data stores by comparing the source address, the destination address, the protocol identifier, and the port identifier of the communication packet with the site-specific application signatures;
      in response to determining that the communication packet signature matches at least one of the site-specific application signatures, determining that the communication packet is to be trusted and allowing the communication packet to be routed without comparing the communication packet to the rules that determine whether the communication packet has vulnerabilities or anomalies, wherein the communication packet signature matches at least one of the site-specific signatures when the source address, the destination address, the protocol identifier, and the port identifier of the communication packet matches the source address, the destination address, the protocol identifier, and the port identifier of the at least one site-specific application signatures; and
      in response to determining that the communication packet signature does not match at least one of the site-specific application signatures, comparing the communication packet to the rules that determine whether the communication packet has vulnerabilities or anomalies by:
         determining whether the communication packet matches the rules;
         in response to determining that the communication packet matches one or more rules, issuing an alert; and
         in response to determining that that communication packet does not match the rules, allowing the communication packet to be routed without issuing the alert.

8. The system of claim 7, wherein the operations further comprise:
in response to determining that the communication packet is to be trusted, allowing the communication packet to be routed without issuing an alert.

9. The system of claim 7, wherein a site-specific application signature comprises a source address of a source computing device from which the communication packet is sent, a destination address of the destination computing device to which the communication packet is sent, a protocol identifier identifying a protocol in which the communication packet is sent, and a port identifier identifying a port on the destination computing device to which the communication packet is sent.

10. The system of claim 7, wherein a site-specific application signature comprises a marking of a payload in the communication packet.

11. The system of claim 7, wherein the operations further comprise:
periodically importing the site-specific application signatures from one or more application signatures data stores.

12. The system of claim 7, wherein the operations further comprise:
querying at least one application signatures data store for the site-specific application signatures.

13. An article of manufacture for monitoring communication packets, wherein the article of manufacture comprises a computer readable medium storing instructions, and wherein the article of manufacture is operable to:
store site-specific application signatures, wherein each of the site-specific application signatures includes a source address, a destination address, a protocol identifier, and a port identifier, wherein each of the site-specific application signatures is associated with an application executing at a specific source computing device;
store rules that determine whether the communication packet has vulnerabilities or anomalies;
receive a communication packet;
determine a communication packet signature of the communication packet, wherein the communication packet signature includes a source address, a destination address, a protocol identifier, and a port identifier;
compare the communication packet signature to the site-specific application signatures by comparing the source address, the destination address, the protocol identifier, and the port identifier of the communication packet with the site-specific application signatures;
in response to determining that the communication packet signature matches at least one of the site-specific application signatures, determine that the communication packet is to be trusted and allowing the communication packet to be routed without comparing the communication packet to the rules that determine whether the communication packet has vulnerabilities or anomalies, wherein the communication packet signature matches at least one of the site-specific signatures when the source address, the destination address, the protocol identifier, and the port identifier of the communication packet matches the source address, the destination address, the protocol identifier, and the port identifier of the at least one site-specific application signatures; and
in response to determining that the communication packet signature does not match at least one of the site-specific application signatures, compare the communication packet to the rules that determine whether the communication packet has vulnerabilities or anomalies by:
determining whether the communication packet matches the rules;
in response to determining that the communication packet matches one or more rules, issuing an alert; and
in response to determining that that communication packet does not match the rules, allowing the communication packet to be routed without issuing the alert.

14. The article of manufacture of claim 13, wherein the article of manufacture is operable to:
in response to determining that the communication packet is to be trusted, allow the communication packet to be routed without issuing an alert.

15. The article of manufacture of claim 13, wherein a site-specific application signature comprises a source address of a source computing device from which the communication packet is sent, a destination address of the destination computing device to which the communication packet is sent, a protocol identifier identifying a protocol in which the communication packet is sent, and a port identifier identifying a port on the destination computing device to which the communication packet is sent.

16. The article of manufacture of claim 13, wherein a site-specific application signature comprises a marking of a payload in the communication packet.

17. The article of manufacture of claim 13, wherein the article of manufacture is operable to:
periodically import the site-specific application signatures from one or more application signatures data stores.

18. The article of manufacture of claim 13, wherein the article of manufacture is operable to:
query at least one application signatures data store for the site-specific application signatures.

19. A apparatus for monitoring communication packets on a network, comprising:
one or more application signatures data stores coupled to the network storing site-specific application signatures, wherein each of the site-specific application signatures includes a source address, a destination address, a protocol identifier, and a port identifier, wherein each of the site-specific application signatures is associated with an application executing at a specific source computing device;
a rules data store storing rules that determine whether a communication packet has vulnerabilities or anomalies; and
an application signatures engine coupled to the network and capable of accessing the one or more application signatures data stores;
wherein the application signatures engine receives a communication packet;
wherein the application signatures engine determines a communication packet signature of the communication packet, wherein the communication packet signature includes a source address, a destination address, a protocol identifier, and a port identifier;
wherein the application signatures engine compares the communication packet signature to the site-specific application signatures in the one or more application signatures data stores by comparing the source address, the destination address, the protocol identifier, and the port identifier of the communication packet with the site-specific application signatures;

wherein the application signatures engine, in response to determining that the communication packet signature matches at least one of the site-specific application signatures, determines that the communication packet is to be trusted and allowing the communication packet to be routed without comparing the communication packet to the rules that determine whether the communication packet has vulnerabilities or anomalies, wherein the communication packet signature matches at least one of the site-specific signatures when the source address, the destination address, the protocol identifier, and the port identifier of the communication packet matches the source address, the destination address, the protocol identifier, and the port identifier of the at least one site-specific application signatures; and wherein the application signatures engine, in response to determining that the communication packet signature does not match at least one of the site-specific application signatures, comparing the communication packet to the rules that determine whether the communication packet has vulnerabilities or anomalies by:
  determining whether the communication packet matches the rules;
  in response to determining that the communication packet matches one or more rules, issuing an alert; and in response to determining that that communication packet does not match the rules, allowing the communication packet to be routed without issuing the alert.

20. The apparatus of claim 19, wherein the application signatures engine is capable of:
  in response to determining that the communication packet is to be trusted, allowing the communication packet to be routed without issuing an alert.

21. The apparatus of claim 19, wherein a site-specific application signature comprises a source address of a source computing device from which the communication packet is sent, a destination address of the destination computing device to which the communication packet is sent, a protocol identifier identifying a protocol in which the communication packet is sent, and a port identifier identifying a port on the destination computing device to which the communication packet is sent.

22. The apparatus of claim 19, wherein a site-specific application signature comprises a marking of a payload in the communication packet.

23. The apparatus of claim 19, wherein the application signatures engine is capable of:
  periodically importing the site-specific application signatures from the one or more application signatures data stores.

24. The apparatus of claim 19, wherein the application signatures engine is capable of:
  querying at least one application signatures data store for the site-specific application signatures.

\* \* \* \* \*